United States Patent
Mu et al.

(10) Patent No.: US 8,725,802 B2
(45) Date of Patent: May 13, 2014

(54) METHOD FOR TRANSFERRING FILE IN CONFERENCE SYSTEM, FILE TRANSFER SYSTEM AND CONFERENCE SERVER

(75) Inventors: Lunjian Mu, Shenzhen (CN); Jue Wang, Shenzhen (CN); Cheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 12/261,203

(22) Filed: Oct. 30, 2008

(65) Prior Publication Data

US 2009/0119389 A1    May 7, 2009

(30) Foreign Application Priority Data

Nov. 1, 2007    (CN) .......................... 2007 1 0166657

(51) Int. Cl.
*G06F 15/163*    (2006.01)
*G06Q 10/10*    (2012.01)

(52) U.S. Cl.
CPC .............. *G06Q 10/101* (2013.01); *G06Q 10/10* (2013.01)
USPC ........... 709/204; 709/205; 709/203; 709/219; 715/753; 715/759

(58) Field of Classification Search
CPC .............................. G06Q 10/10; G06Q 10/101
USPC .......................... 709/204–206, 203, 217–219; 715/753–759
See application file for complete search history.

(56) References Cited

U.S. PATENT DOCUMENTS

| | | | |
|---|---|---|---|
| 2004/0202303 A1* | 10/2004 | Costa-Requena et al. | 379/205.01 |
| 2005/0287998 A1 | 12/2005 | Tonouchi | |
| 2008/0229239 A1* | 9/2008 | Elumalai et al. | 715/810 |
| 2009/0037520 A1* | 2/2009 | Loffredo | 709/203 |

FOREIGN PATENT DOCUMENTS

| | | |
|---|---|---|
| CN | 1185071 A | 6/1998 |
| CN | 1875609 A | 12/2006 |
| WO | WO 2006/090080 A1 | 8/2006 |

OTHER PUBLICATIONS

State Intellectual Property Office of the People'S Republic of China, Examination Report in Chinese Patent Application No. 200710166657.5 (Mar. 31, 2010).
"Instant Messaging using SIMPLE," Nov. 29, 2006, Draft Version 1.0, Open Mobile Alliance, San Diego, California.

* cited by examiner

*Primary Examiner* — Kenneth Coulter
(74) *Attorney, Agent, or Firm* — Leydig, Voit & Mayer, Ltd.

(57) ABSTRACT

A method for transferring a file in a conference system is provided, which includes the following steps. A file sending UE sends a conference identification of the conference to the file receiving UE through a conference server; and sends the file to the file receiving UE through the conference server. A conference server, and a file sending and receiving UE are also provided. In the present invention, when a user sends a file to another user in a conference, a conference identification of the conference, together with the file, is sent to the file receiving user, so that the file receiving user can get to know the conference associated with the file when receiving the file, thereby enhancing the experience enjoyed by the file receiving user.

18 Claims, 7 Drawing Sheets

METHOD FOR TRANSFERRING FILE IN CONFERENCE SYSTEM, FILE TRANSFER SYSTEM AND CONFERENCE SERVER

CROSS-REFERENCE TO RELATED APPLICATIONS

This application claims priority to Chinese Patent Application No. 200710166657.5, filed Nov. 1, 2007, entitled "Method For Transferring File In Conference System, File Transfer System And Conference Server," the content of which is hereby incorporated by reference in its entirety.

FIELD OF THE INVENTION

The present invention relates to the file transmission field, and in particular, to a method for transferring a file in a conference system, a file transfer system, and a conference server.

BACKGROUND

The IP multimedia subsystem (IMS/MMD) is a standard established by the third generation partnership project (3GPP/3GPP2) for rapidly providing and deploying various multimedia services. One of the important features of the IP multimedia subsystem is to use the session initiation protocol (SIP) as a calling and signaling control function.

The SIP-based conference framework is an important function for the IP multimedia subsystem. The conference function is achieved between conference participants and a conference server through the SIP and the SIP-based protocol.

A user in a conference generally needs to send a file to all the other users or a part of the users in the conference, and the users who received the file may accept or refuse the file in the conference window. The flow for transferring a file to a user is described as follows: a file sender requests to make a session with a file receiver, negotiates to establish a file transmission channel, such as a message session relay protocol (MSRP) channel, between the file sender and the file receiver in the session, sends the file to the file receiver through the established file transmission channel, and terminates the file transmission channel when the file transmission is finished. The process for transferring a file to more than one user is described as follows: a file sender requests to make a session with a conference server and negotiates to establish a file transmission channel, such as a MSRP channel, between the file sender and the conference server in the session; the conference server requests to make a session with each file receiver respectively, and negotiates to establish a file transmission channel, such as a MSRP channel, between the conference server and each file receiver in the session; the file sender sends the file to the conference server through the established file transmission channel; and then the conference server sends the file to the file receivers, and terminates the file transmission channels between the file sender and the conference server and between the conference server and the file receivers when the file transmission is finished.

It can be seen from the above descriptions that, since a user in a conference sends a file to the other users in the conference through a file transmission session independent of the conference session, and the file sender would not send the conference information to the file receivers, the file receivers cannot get to know the association between the file and the conference, when receiving the file. In actual applications, if the file is associated with the conference, the file receiver generally needs to know the conference information associated with the file upon receiving the file, so as to facilitate the subsequent processing.

SUMMARY

The present invention is directed to a method for transferring a file in a conference system, a file transfer system, and a conference server, which are suitable for enabling file receivers to know the conference information associated with a file, when a user in a SIP conference sends the file to the other users in the conference, and thus enhancing the experience enjoyed by the file receivers.

The technical solution of the present invention is achieved as follows.

A method for transferring a file in a conference system includes the following steps.

The file sending user equipment (UE) sends a conference identification of the conference to the file receiving UE through a conference server. And the file sending UE sends the file to the file receiving UE through the conference server.

A file transfer system includes a file sending UE, a conference server, and a file receiving UE.

The file sending UE is configured to send a conference identification of the conference and a file to the conference server;

The conference server is configured to send the conference identification and the file from the file sending UE to the file receiving UE.

A conference server includes a conference identification transceiver module and file transceiver module.

The conference identification transceiver module is configured to receive a conference identification from a file sending UE, and send the conference identification to a file receiving UE.

The file transceiver module is configured to receive a file from the file sending UE, and send the file to the file receiving UE.

Compared with the conventional art, in the present invention, when a user sends a file to the other users in a conference that the user participates in, a conference identification is sent together with the file to the file receiving users through a conference server, so that the file receiving users can get to know that the file comes from the conference they participate in when receiving the file, thereby enhancing the experience enjoyed by the file receiving users.

DETAILED DESCRIPTION

The present invention is illustrated below in detail with reference to the accompanying drawings and specific embodiments.

The UE in the embodiments of the present invention represents the client used by the user participating in the conference. The conference server represents a logical entity used by the network to provide a multiparty conference session service for users. The conference provided by the present invention represents a single conference, and each conference is represented by a unique conference identification (Conference URI). The SIP/IP core is a core for routing the SIP signaling.

In the following embodiments, it is assumed that the participating users and the conference server belong to the same home network.

The file transmission channel mentioned in the present invention may be a MSRP channel, or a real-time transmission protocol (RTP) carrier. The MSRP channel is taken as an example in the following embodiments.

Figure 1:
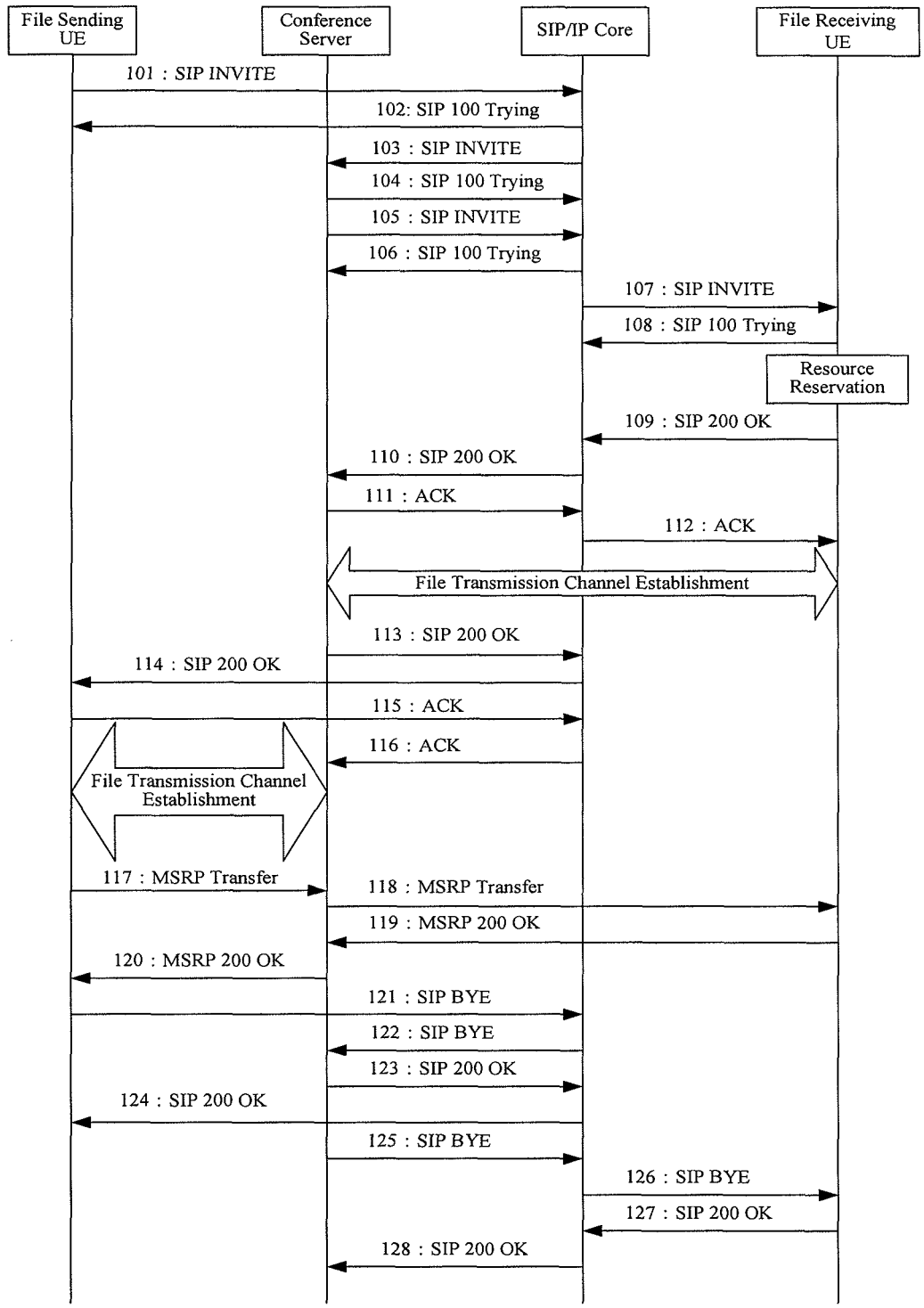
FIG. 1 is a timing diagram of a message flow for transferring a file in a SIP conference, according to a first embodiment of the present invention.

FIG. 1 is a timing diagram of a message flow for transferring a file in a SIP conference, according to a first embodiment of the present invention. In this embodiment, the file is transmitted by establishing a new session in the existing conference. As shown in FIG. 1, the specific steps are illustrated as follows.

In Step 101, a user will send a file to the other users in a conference that the user participates in. The file sending UE sends a SIP INVITE message with a message body describing a media type of the file transmission session to the conference server. The request-uniform resource identifier (URI) in the message is the conference identification or the conference URI, and the value of the session ID (Call-ID) in the message is different from the Call-ID value of any existing session included in the conference indicated by the request URI, which instructs to request to establish a new session in the existing conference for transmitting files.

A list of file receiving users may also be carried in the SIP INVITE message, if not, it represents that all the users except the file sending user in the conference are all the file receiving users.

In each embodiment of the present invention, before determining to send the file, the file sending UE may obtain information of users participating in the conference in which the file sending UE participates through a SIP subscription/notification mechanism in advance, and then select a part of the participating users as the file receiving UE, according to the information of the participating users.

The description information of the session description protocol (SDP) in the SIP INVITE message carries the file sending indication information, to notify the conference server that the file sending UE itself will send a file; or alternatively, the file sending indication information may also be added in the SIP INVITE message, for example, a feature code: Accept-Contact:+g.filetransfer is added in the SIP INVITE message.

In Step 102, the SIP/IP core receives the SIP INVITE message, and returns a SIP 100 Trying message to the file sending UE.

In Steps 103 to 104, the SIP/IP core forwards the SIP INVITE message to the conference server, and then receives the SIP 100 Trying message returned by the conference server.

In Step 105, the conference server, who has received the SIP INVITE message, determines whether to accept the invite request to establish a new session for supporting the file transmission or not, if yes, a SIP INVITE message is sent to the SIP/IP core, and Step 106 is executed; otherwise, the indication information for the file transmission session establishment failure is returned to the file sending UE, and the flow ends.

The Request-URI, Call-ID, and SDP description information in the SIP INVITE message sent by the conference server are the same as those of the SIP INVITE message in Step 101. Similarly, the file sending indication information may also be added in the SIP INVITE message sent by the conference server, for example, a feature code: Accept-Contact:+g.filetransfer is added in the SIP INVITE message.

In Steps 106 to 108, the SIP/IP core receives the SIP INVITE message, returns the SIP 100 Trying message to the conference server, and sends the SIP INVITE message to the file receiving UE. The file receiving UE receives the SIP INVITE message, and returns the SIP 100 Trying message to the conference server.

In Steps 109 to 110, the file receiving UE performs a file transmission resource reservation according to the SDP description information carried in the SIP INVITE message, and returns a SIP 200 OK message to the conference server via the SIP/IP core once the reservation is completed. The SIP 200 OK message carries information relevant to the negotiated file transmission resource.

In Steps 111 to 112, the conference server receives the SIP 200 OK message, and returns an ACK message to the file receiving UE via the SIP/IP core.

It should be noted that, when there is more than one file receiving UE, Steps 105 to 112 should be executed once between the conference server and each file receiving UE.

Once Steps 105 to 112 are successfully finished between the conference server and certain file receiving UE, a new session is established between the conference server and the file receiving UE. Meanwhile, a file transmission channel between the conference server and the file receiving UE has been established as well. If some file receiving UE fails to finish executing Steps 105 to 112, for example, the conference server fails to receive the SIP 200 OK message returned by the file receiving UE in Step 110 in time, the conference server actively sends an SIP CANCEL message to the file receiving UE due to the timeout of the session signaling server, so as to terminate the session to be established.

In Steps 113 to 114, the conference server determines that the file transmission channel between itself and the file receiving UE has been established, and returns the SIP 200 OK message to the file sending UE via the SIP/IP core.

In Steps 115 to 116, the file sending UE receives the SIP 200 OK message, and returns the ACK message to the conference server via the SIP/IP core.

So far, a new session is established between the conference server and the file sending UE. Meanwhile, the file transmission channel between the conference server and the file sending UE has been established, and the session channel for the file sending UE to send the file to the file receiving UE has also been established.

In Steps 117 to 118, the file sending UE sends a MSRP SEND message to the conference server via the established file transmission channel, i.e., the MSRP channel, and when receiving the MSRP SEND message, the conference server sends the MSRP SEND message to each file receiving UE by utilizing the established MSRP channel.

As defined by the MSRP protocol, the file may be sent in segments through a plurality of MSRP SEND messages, until the entire file has been transmitted.

In Steps 119 to 120, when receiving the MSRP SEND message, the file receiving UE returns a MSRP 200 OK message to the conference server, and the conference server returns the MSRP 200 OK message to the file sending UE after receiving the MSRP 200 OK messages returned by all the file receiving users.

In Step 118, when receiving the MSRP SEND message from the file sending UE, the conference server returns the MSRP 200 OK message immediately to the file sending UE and meanwhile sends the MSRP SEND message to each file receiving UE. At the same time, Step 120 is deleted.

In Steps 121 to 122, the file sending UE determines that the file transmission is finished, and sends a SIP BYE message to the conference server via the SIP/IP core, to request to terminate the file transmission session.

In Steps 123 to 124, the conference server receives the SIP BYE message, and returns the SIP 200 OK message to the file sending UE via the SIP/IP core.

In Steps 125 to 128, the conference server determines that the file transmission is finished, and sends the SIP BYE message to each file receiving UE via the SIP/IP core. Each file receiving UE receives the SIP BYE message, and then returns the SIP 200 OK message to the conference server via the SIP/IP core.

Figure 2:
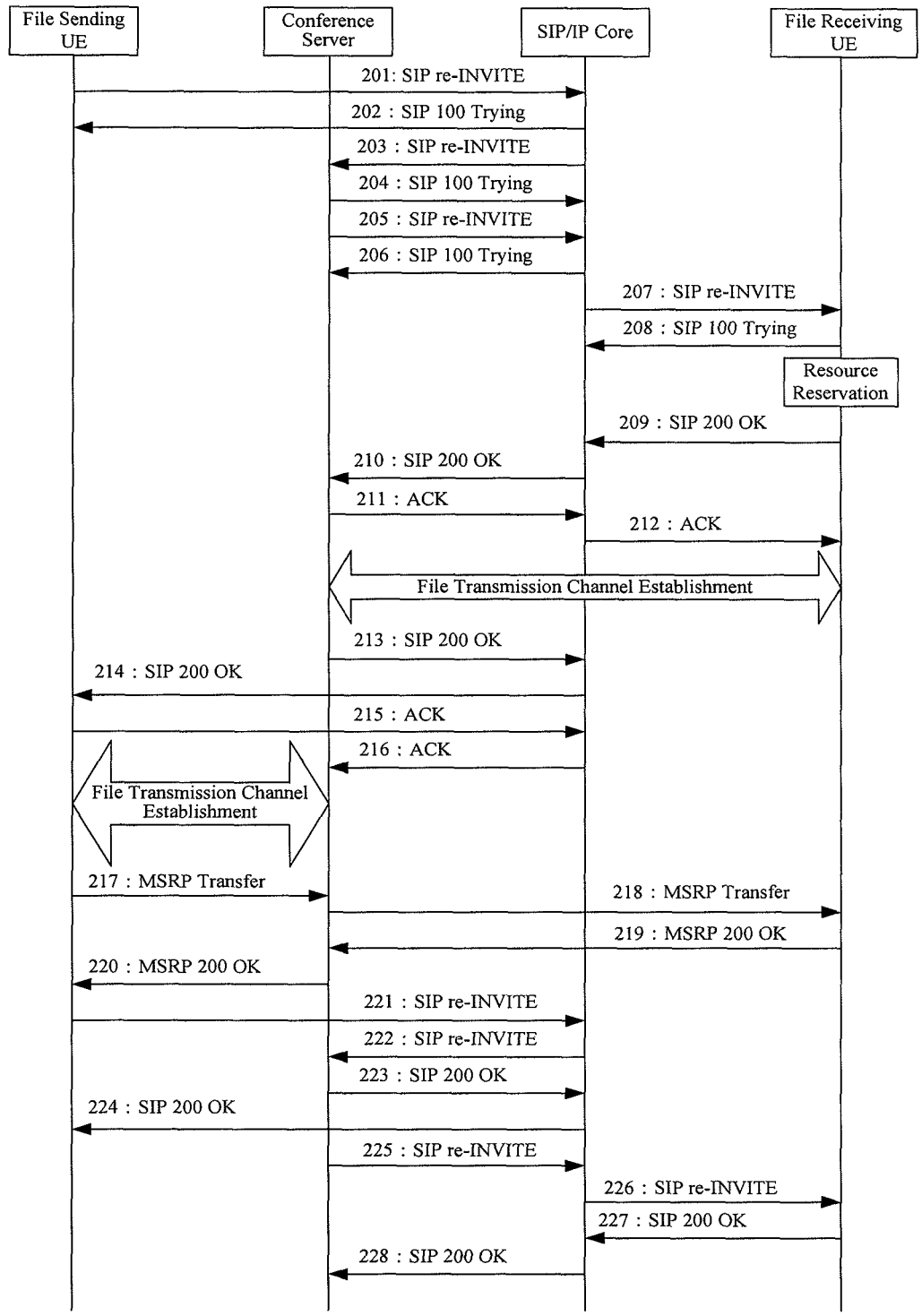
FIG. 2 is a timing diagram of a message flow for transferring a file in a SIP conference, according to a second embodiment of the present invention.

FIG. 2 is a timing diagram of a message flow for transferring a file in a SIP conference, according to a second embodiment of the present invention. In this embodiment, the file is transmitted by adding a file transmission capability in the existing session of the existing conference. As shown in FIG. 2, the specific steps are described as follows.

In Step 201, a user will send a file to the other users in a conference that the user participates in, and the file sending UE sends a SIP re-INVITE message with a message body describing a media type of the file transmission session to the conference server.

The Request-URI in the SIP re-INVITE message is a conference identification or a conference URI, and the value of Call-ID in the message is the same as the value of the Call-ID of another existing session included in the conference indicated by the request-URI, so as to request to add the file transmission capability in the existing session of the existing conference.

A list of file receiving users may also be carried in the SIP re-INVITE message; if not, it indicates that all the users except the file sending user in the conference are the file receiving users.

The SDP description information in the SIP re-INVITE message carries file sending indication information, to notify the conference server that the file sending UE itself will send a file; or alternatively, the file sending indication information may also be added in the SIP re-INVITE message, for example, a feature code: Accept-Contact:+g.filetransfer is added in the SIP re-INVITE message.

In Step 202, the SIP/IP core receives the SIP re-INVITE message, and returns a SIP 100 Trying message to the file sending UE.

In Steps 203 to 204, the SIP/IP core forwards the SIP re-INVITE message to the conference server, and then receives the SIP 100 Trying message returned by the conference server.

In Step 205, the conference server receives the SIP re-INVITE message, determines whether to accept the re-invite request to adjust the existing conference session to add the file transmission capability or not, if yes, the SIP re-INVITE message is sent to the SIP/IP core, and Step 206 is executed; otherwise, the indication information for the failure in adding file transmission capability is returned to the file sending UE, and the flow ends.

The Request-URI, Call-ID, and SDP description information in the SIP re-INVITE message sent by the conference server are the same as those of the SIP re-INVITE message in Step 201. Similarly, the file sending indication information may be added in the SIP re-INVITE message sent by the conference server, for example, a feature code: Accept-Contact:+g.filetransfer is added in the SIP re-INVITE message.

In Steps 206 to 208, the SIP/IP core receives the SIP re-INVITE message, returns the SIP 100 Trying message to the conference server, and forwards the SIP re-INVITE message to the file receiving UE. The file receiving UE receives the SIP re-INVITE message, and returns the SIP 100 Trying message to the SIP/IP core.

In Steps 209 to 210, the file receiving UE know that the file sending UE will send a file to the file receiving UE itself according to the SDP description information in the SIP re-INVITE message, then performs a file transmission resource reservation according to the SDP description information carried in the message, and returns a SIP 200 OK message to the conference server via the SIP/IP core once the reservation is completed. The SIP 200 OK message carries information relevant to the negotiated file transmission resource.

In Steps 211 to 212, the conference server receives the SIP 200 OK message, and returns an ACK message to the file receiving UE via the SIP/IP core.

It should be noted that, when there is more than one file receiving UE, Steps 205 to 212 should be executed once between the conference server and each file receiving UE.

Once Steps 205 to 212 have been successfully finished between the conference server and certain file receiving UE, a media capability has been adjusted in the original conference session between the conference server and the file receiving UE. That is, the file transmission capability is added in the conference session, and correspondingly, a file transmission channel between the conference server and the file receiving UE has been established. If some file receiving UE fails to finish executing Steps 205 to 212, for example, the conference server fails to receive the SIP 200 OK message returned by the file receiving UE in Step 210 in time, the conference server actively sends a SIP CANCEL message to the file receiving UE due to the timeout of the session signaling server, so as to request to terminate the adjustment of the media capability of the original conference session.

In Steps 213 to 214, the conference server returns the SIP 200 OK message to the file sending UE via the SIP/IP core.

In Steps 215 to 216, the file sending UE returns an ACK message to the conference server via the SIP/IP core.

So far, the original conference session between the conference server and the file sending UE has been adjusted. That is, the file transmission capability is added in the conference session, and correspondingly, the file transmission channel between the conference server and the file sending UE has been established. A session channel for the file sending UE to send the file to the file receiving UE has been established.

In Steps 217 to 218, the file sending UE sends a MSRP SEND message to the conference server through the established file transmission channel, i.e. MSRP channel, and when receiving the MSRP SEND message, the conference server sends the MSRP SEND message to each file receiving UE through the established MSRP channel.

As defined by the MSRP protocol, the file may be sent in segments through a plurality of MSRP SEND messages, until the entire file has been transmitted.

In Steps 219 to 220, when receiving the MSRP SEND message, the file receiving UE returns a MSRP 200 OK message to the conference server, and the conference server returns the MSRP 200 OK message to the file sending UE after receiving the MSRP 200 OK messages returned by all the file receiving users.

In Step 218, when receiving the MSRP SEND message from the file sending UE, the conference server returns the MSRP 200 OK message immediately to the file sending UE and meanwhile sends the MSRP SEND message to each file receiving UE. At the same time, Step 220 is deleted.

In Steps 221 to 224, the file sending UE determines that the file transmission is finished, and sends a SIP re-INVITE message without the message body describing the media type of the file transmission session to the conference server via the SIP/IP core. The conference server receives the SIP re-INVITE message, then re-adjusts the existing conference session, removes the file transmission capability of the session, and returns the SIP 200 OK message to the file sending UE via the SIP/IP core.

In Steps 225 to 228, the conference server determines that the file transmission is finished, and sends the SIP re-INVITE message without the message body describing the media type of the file transmission session to each file receiving UE, respectively, via the SIP/IP core. The file receiving UE receives the SIP re-INVITE message, then re-adjusts the existing conference session, removes the file transmission capability of the session, and returns the SIP 200 OK message to the conference server via the SIP/IP core.

The SIP re-INVITE message in the embodiment as shown in FIG. 2 may be replaced by an update message.

It should be noted that, in both the embodiments shown in FIG. 1 and FIG. 2, the file transmission channel between the conference server and the file receiving UE is established first, and then the file transmission channel between the file sending UE and the conference server is established. In actual applications, there is no specified sequence for establishing the file transmission channel between the conference server and the file receiving UE and establishing the file transmission channel between the conference server and the file sending UE. It can be seen that, Steps 105 to 112 in the embodiment as shown in FIG. 1 are the process for establishing the file transmission channel between the conference server and the file receiving UE, and Steps 113 to 116 are the process for establishing the file transmission channel between the conference server and the file sending UE. In actual applications, there is no specified sequence for executing Steps 105 to 112 first or executing Steps 113 to 116 first. Similarly, Steps 205 to 212 in the embodiment as shown in FIG. 2 are the process for establishing the file transmission channel between the conference server and the file receiving UE, and Steps 213 to 216 are the process for establishing the file transmission channel between the conference server and the file sending UE. In actual applications, there is no specified sequence for executing Steps 205 to 212 first or executing Steps 213 to 216 first.

Both the embodiments shown in FIG. 1 and FIG. 2 demonstrate the case that the file sending user sends the file, after the file transmission channel between the file sending UE and the conference server and that between the conference server and the file receiving UE have been established. In the actual applications, once the file transmission channel between the file sending UE and the conference server has been established, a file may be uploaded to the conference server, then, the file transmission channel between the conference server and the file receiving UE is established, and then the conference server sends the file to the file receiving UE.

Figure 3:
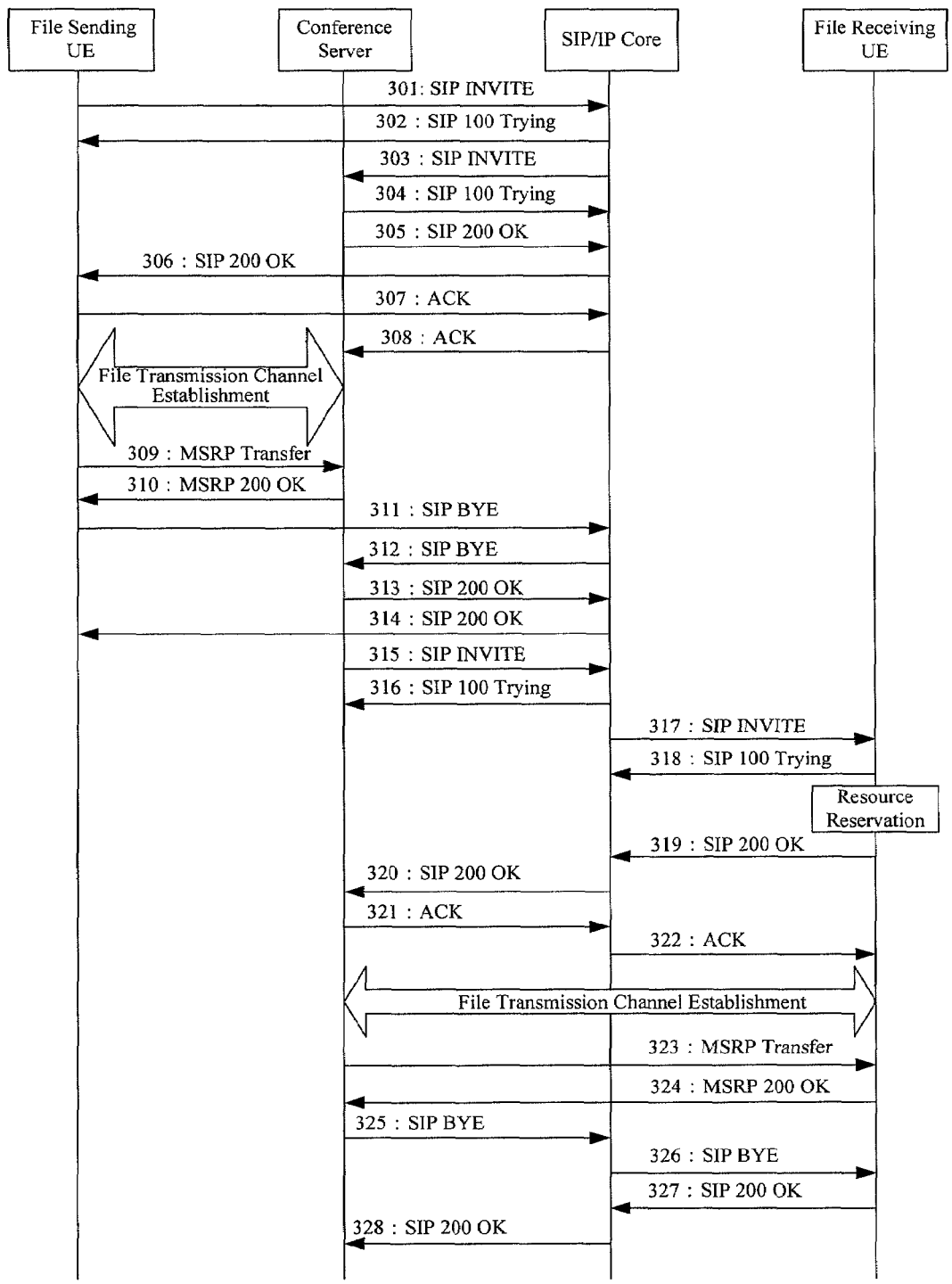
FIG. 3 is a timing diagram of a message flow for transferring a file in a SIP conference, according to a third embodiment of the present invention.

FIG. 3 is a timing diagram of a message flow for transferring a file in a SIP conference, according to a third embodiment of the present invention. In this embodiment, once a file transmission channel between the file sending UE and the conference server has been established, a file is immediately uploaded to the conference server, and then a file transmission channel between the conference server and the file receiving UE is established. As shown in FIG. 3, the specific steps are described as follows.

Steps 301 to 304 are the same as Steps 101 to 104.

In Steps 305 to 306, the conference server receives the SIP INVITE message, and determines whether to accept the invite request to establish a new session for supporting the file transmission or not, if yes, a SIP 200 OK message is returned to the file sending UE via the SIP/IP core, and Step 307 is executed; otherwise, the indication information for the file transmission session establishment failure is returned to the UE via the SIP/IP core.

In Steps 307 to 308, the file sending UE returns an ACK message to the conference server via the SIP/IP core.

So far, the file transmission channel between the file sending UE and the conference server has been established.

In Steps 309 to 310, the file sending UE sends a MSRP SEND message to the conference server through the established file transmission channel, i.e., MSRP channel, and when receiving the MSRP SEND message, the conference server returns a MSRP 200 OK message to the file sending UE.

As defined by the MSRP protocol, the file may be sent in segments through a plurality of MSRP SEND messages, until the entire file has been transmitted.

In Steps 311 to 314, the file sending UE determines that the file transmission is finished, and sends a SIP BYE message to the conference server via the SIP/IP core, so as to request to terminate the file transmission session. The conference server receives the SIP BYE message and returns the SIP 200 OK message to the file sending UE.

In Step 315, the conference server sends the SIP INVITE message to the file receiving UE via the SIP/IP core.

Steps 316 to 322 are the same as Steps 106 to 112.

In Steps 323 to 324, the conference server sends the MSRP SEND message to the file receiving UE through the established file transmission channel, i.e., MSRP channel, and when receiving the MSRP SEND message, the file receiving UE returns the MSRP 200 OK message to the file sending UE via the conference server.

As defined by the MSRP protocol, the file may be sent in segments through a plurality of MSRP SEND messages, until the entire file has been transmitted.

In Steps 325 to 328, the conference server determines that the file transmission is finished, and sends the SIP BYE message to each file receiving UE via the SIP/IP core. Each file receiving UE receives the SIP BYE message, and returns the SIP 200 OK message to the conference server via the SIP/IP core.

It should be noted that, when there is more than one file receiving UE, Steps 315 to 328 should be executed once between the conference server and each file receiving UE.

Figure 4:
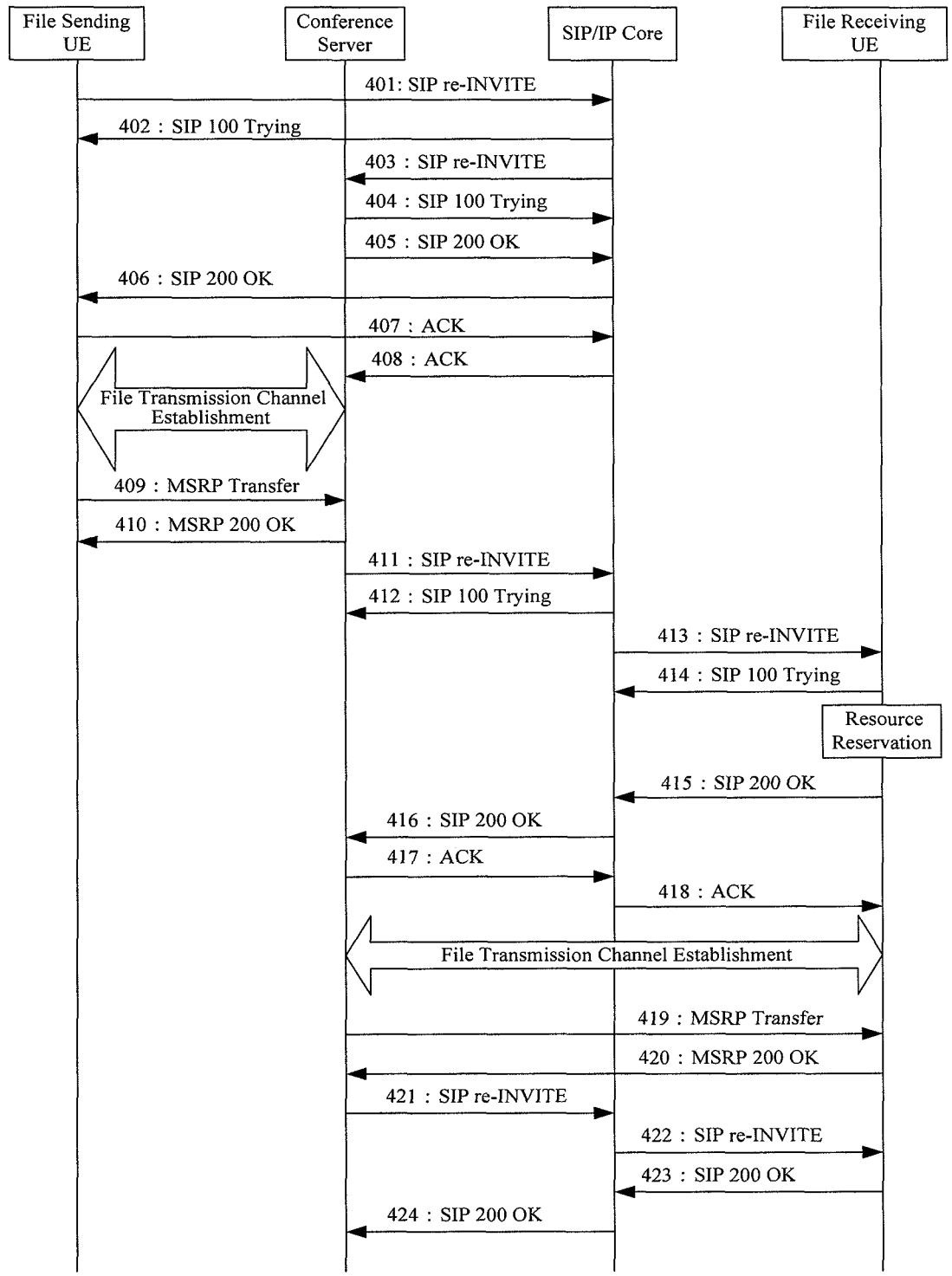
FIG. 4 is a timing diagram of a message flow for transferring a file in a SIP conference, according to a fourth embodiment of the present invention.

FIG. 4 is a timing diagram of a message flow for transferring a file in a SIP conference, according to a fourth embodiment of the present invention. In this embodiment, once a file transmission channel between the file sending UE and the conference server has been established, a file is immediately uploaded to the conference server, and then a file transmission channel between the conference server and the file receiving UE is established. As shown in FIG. 4, the specific steps are described as follows.

Steps 401 to 404 are the same as Steps 201 to 204.

In Steps 405 to 406, the conference server receives a SIP re-INVITE message, and determines whether to accept the re-invite request to adjust the existing conference session to add the file transmission capability or not, if yes, a SIP 200 OK message is returned to the file sending UE via the SIP/IP core, and Step 407 is executed; otherwise, the indication information for the failure in adding file transmission capability is returned to the file sending UE, and the flow ends.

In Steps 407 to 408, the file sending UE returns an ACK message to the conference server via the SIP/IP core.

So far, the file transmission channel between the file sending UE and the conference server has been established.

In Steps 409 to 410, the file sending UE sends a MSRP SEND message to the conference server through the established file transmission channel, i.e., MSRP channel. When receiving the MSRP SEND message, the conference server returns a MSRP 200 OK message to the file sending UE.

As defined by the MSRP protocol, the file may be sent in segments through a plurality of MSRP SEND messages, until the entire file has been transmitted.

In Step 411, the conference server sends a SIP re-INVITE message to the file receiving UE via the SIP/IP core.

Steps 412 to 418 are the same as Steps 206 to 212.

In Steps 419 to 420, the conference server sends the MSRP SEND message to the file receiving UE through the established file transmission channel, i.e. MSRP channel. When receiving the MSRP SEND message, the file receiving UE returns the MSRP 200 OK message to the file sending UE via the conference server.

As defined by the MSRP protocol, the file may be sent in segments through a plurality of MSRP SEND messages, until the entire file has been transmitted.

In Steps 421 to 424, the conference server determines that the file transmission is finished, removes the file transmission capability of the conference session, and sends a SIP re-INVITE message without the message body describing the media type of the file transmission session to each file receiving UE via the SIP/IP core. The file receiving UE receives the SIP re-INVITE message, then re-adjusts the existing conference session, removes the file transmission capability of the session, and returns the SIP 200 OK message to the conference server via the SIP/IP core.

It should be noted that, when there is more than one file receiving UE, Steps 411 to 424 should be executed once between the conference server and each file receiving UE.

In the above embodiments shown in FIGS. 1 to 4, the file sending UE must send the file to the file receiving UE through the conference server of the conference in which the file sending UE participates. In actual applications, the file sending UE may first obtain URI information of all users in the conference in which the file sending UE participates through a SIP subscription/notification mechanism supported by the current SIP technique in advance, then select the file receiving user according to the user URI information, and then send the file to the file receiving UE through a conference server of a conference that the file sending UE does not participate in.

When the file sending user decides to send the file through a conference server of a conference that it does not participate in, the information of the conference that the file sending user participates in needs to be informed to the conference server, so that the file receiving user gets to know the conference associated with the file.

The following descriptions are directed to a timing diagram of a message flow for transferring a file in a SIP conference, according to a fifth embodiment of the present invention, which includes the following steps.

In Step 01, through the SIP subscription/notification mechanism, the file sending UE obtains information of all participating users in the conference in which the file sending UE participates, determines the file receiving user to which it will send the file according to the information of the participating users, and then sends a SIP INVITE message with a message body describing the media type of the file transmission session to a conference server of a conference that the file sending UE does not participate in.

The SIP INVITE message carries a list of file receiving users and conference identification associated with the file transmission. The conference identification may be achieved by adding a message head in the SIP INVITE message, for example, adding a message head carrying the conference URI to the SIP INVITE message, for example, Original-To, or alternatively, adding the conference URI in the parameters such as Content-type, Content-Disposition.

The following steps are executed after Step 01.

I. Steps 102 to 128 are executed.
II. Steps 202 to 222 are executed.
III. Steps 302 to 328 are executed.
IV. Steps 402 to 429 are executed.

It can be seen that, in the above embodiments, once the file transmission channel between the conference server and the file receiving user is established, the conference server transfers the file directly to the file receiving user. However, in actual applications, the file receiving user may be unwilling to receive the file due to various reasons. Therefore, in order to enhance the experience enjoyed by the user, in the embodiments of the present invention, the file receiving user is first notified that there is a file to be sent before the file is transferred to the file receiving UE, and then when the file receiving user decides to receive the file, the conference server is requested to send the file.

There are two ways to notify the file receiving user that there is a file to be sent: one is that the file sending user sends the notification, and the other is that the conference server sends the notification. Two embodiments of the present invention are given below, according to the above two ways.

Figure 5:
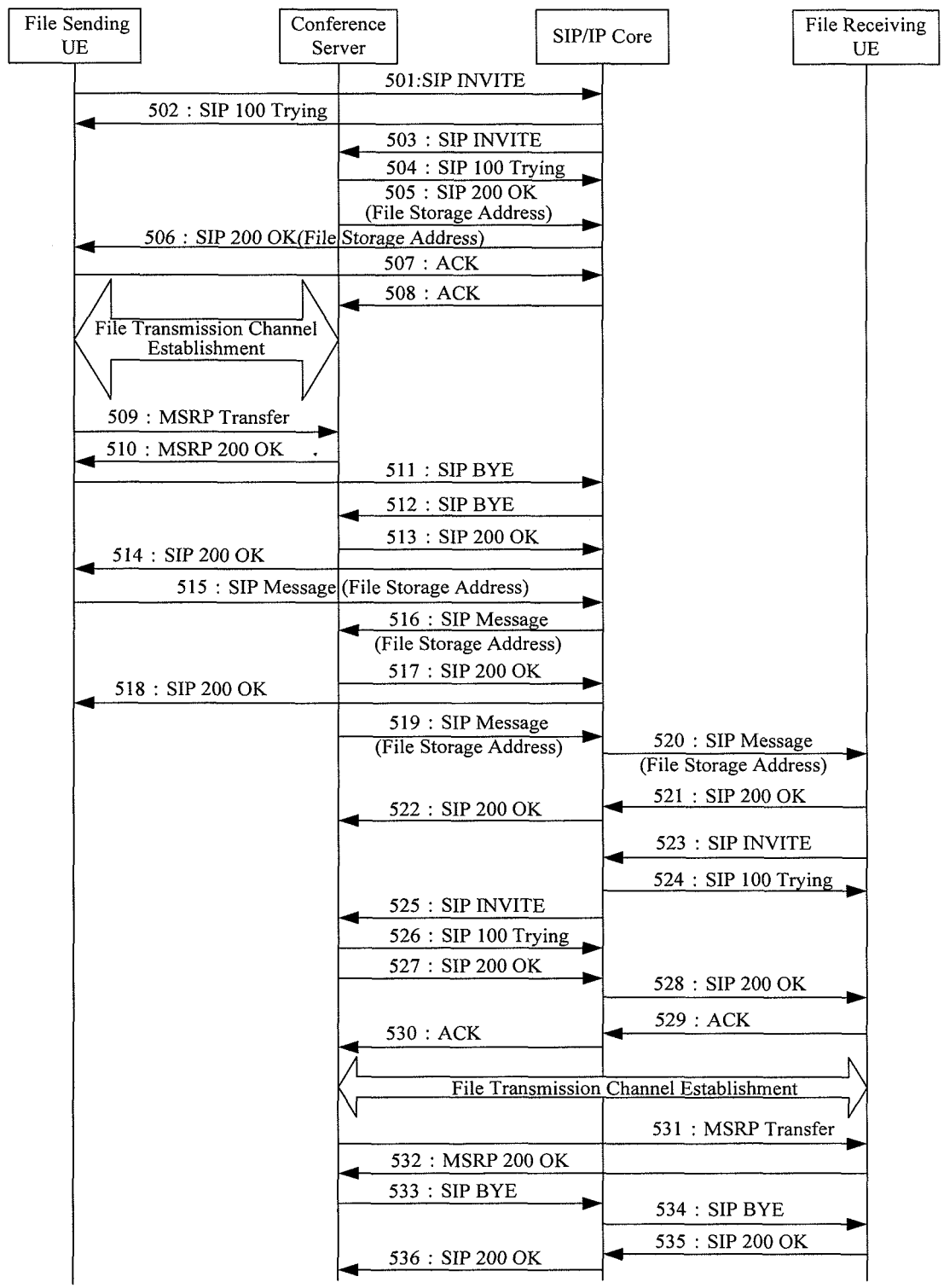
FIG. 5 is a timing diagram of a message flow for transferring a file in a SIP conference, according to a sixth embodiment of the present invention.

FIG. 5 is a timing diagram of a message flow for transferring a file in a SIP conference system, according to a sixth embodiment of the present invention. As shown in FIG. 5, the specific steps are described as follows.

Steps 501 to 504 are the same as Steps 301 to 304.

In Steps 505 to 506, the conference server determines a storage address for the file, and returns a SIP 200 OK message carrying the file storage address to the file sending UE via the SIP/IP core. The file sending UE receives the SIP 200 OK message, and stores the file storage address carried by the message.

Steps 507 to 508 are the same as Steps 307 to 308.

In Steps 509 to 510, the file sending UE sends a MSRP SEND message to the conference server through the established file transmission channel, i.e., MSRP channel. After receiving the MSRP SEND message, the conference server stores the file carried by the message to the storage address determined in Step 505 and returns the MSRP 200 OK message to the file sending UE.

As defined by the MSRP protocol, the file may be sent in segments through a plurality of MSRP SEND messages, until the entire file has been transmitted.

Steps 511 to 514 are the same as Steps 311 to 314.

In Steps 515 to 518, the file sending UE carries the file storage address stored by itself in a SIP MESSAGE, sends it to the conference serve via the SIP/IP core, and then receives the SIP 200 OK message returned by the conference server via the SIP/IP core.

The SIP MESSAGE further carries the conference identification associated with the file transmission as well as the list of file receiving users. If no list of file receiving users is carried in the SIP MESSAGE, it indicates that all the users except the file sending user in the conference corresponding to the conference identification associated with the file transmission are file receiving users.

In Steps 519 to 522, the conference server sends the SIP MESSAGE carrying the file storage address to each file receiving UE via the SIP/IP core, respectively, and then receives the SIP 200 OK message returned by the file receiving UEs.

The SIP MESSAGE sent by the conference server also carries the conference identification associated with the file transmission. Meanwhile, if a list of file receiving users is carried in the SIP MESSAGE in Step 515, the same list of file receiving users is carried in this SIP MESSAGE.

In Steps 523 to 526, the file receiving UE receives the SIP MESSAGE, and reminds the file receiving user that there is a file to be sent. After the file receiving user confirms to receive the file, the file receiving UE sends a SIP INVITE message with a message body describing the media type of the file transmission session to the conference server via the SIP/IP core. After receiving the SIP INVITE message, the SIP/IP core returns a SIP 100 Trying message to the file receiving UE. When receiving the SIP INVITE message, the conference server returns the SIP 100 Trying message to the SIP/IP core.

In Steps 527 to 530, the conference server returns a SIP 200 OK message to the file receiving UE via the SIP/IP core, and after receiving the SIP 200 OK message, the file receiving user returns an ACK message to the conference server via the SIP/IP core.

Once Steps 523 to 530 have been successfully finished between the conference server and a certain file receiving UE, a new session is established between the conference server and the UE, and meanwhile, a file transmission channel between the conference server and the UE has been established. If the conference server and some file receiving UE fail to finish executing Steps 523 to 530, for example, the file receiving UE does not receive the SIP 200 OK message returned by the conference server in Step 528 in time, the file receiving UE actively sends a SIP CANCEL message to the conference server due to the timeout of the SIP session signaling, so as to request to terminate the session to be established.

Steps 531 to 536 are the same as Steps 323 to 328.

It should be noted that, when there is more than one file receiving UE, Steps 519 to 536 should be executed once between the conference server and each file receiving UE.

Steps 519 to 536 aim at establishing the file transmission channel between the conference server and the file receiving UE. In Steps 519 to 536, the file transmission channel is established in the conference session of the conference that the file receiving UE participates in. In actual applications, the file transmission channel between the conference server and the file receiving UE may be established in a conference session independent of the conference session that the file receiving UE participates in. The conference session independent of the conference session that the file receiving UE participates in may be a SIP-based session, and may also be a session based on other protocols, for example, a session based on the hypertext transfer protocol (HTTP). For example, when the file transmission channel is established between the conference server and the file receiving UE by employing the HTTP-based conference session in Steps 519 to 536, the messages interacted between the conference server and the file receiving UE are all HTTP messages in Steps 519 to 536. The specific message interaction process is the same as the existing process for establishing the HTTP-based session.

Furthermore, in the embodiment as shown in FIG. 5, the conference server may not send the file storage address to the file sending UE through the SIP 200 OK message in Steps 505 or 506, but through the last MSRP 200 OK message sent to the file sending UE in Step 510, or send the file storage address to the file sending UE through sending one exclusive SIP MESSAGE carrying the file storage address in Steps 510 and 511.

Figure 6:
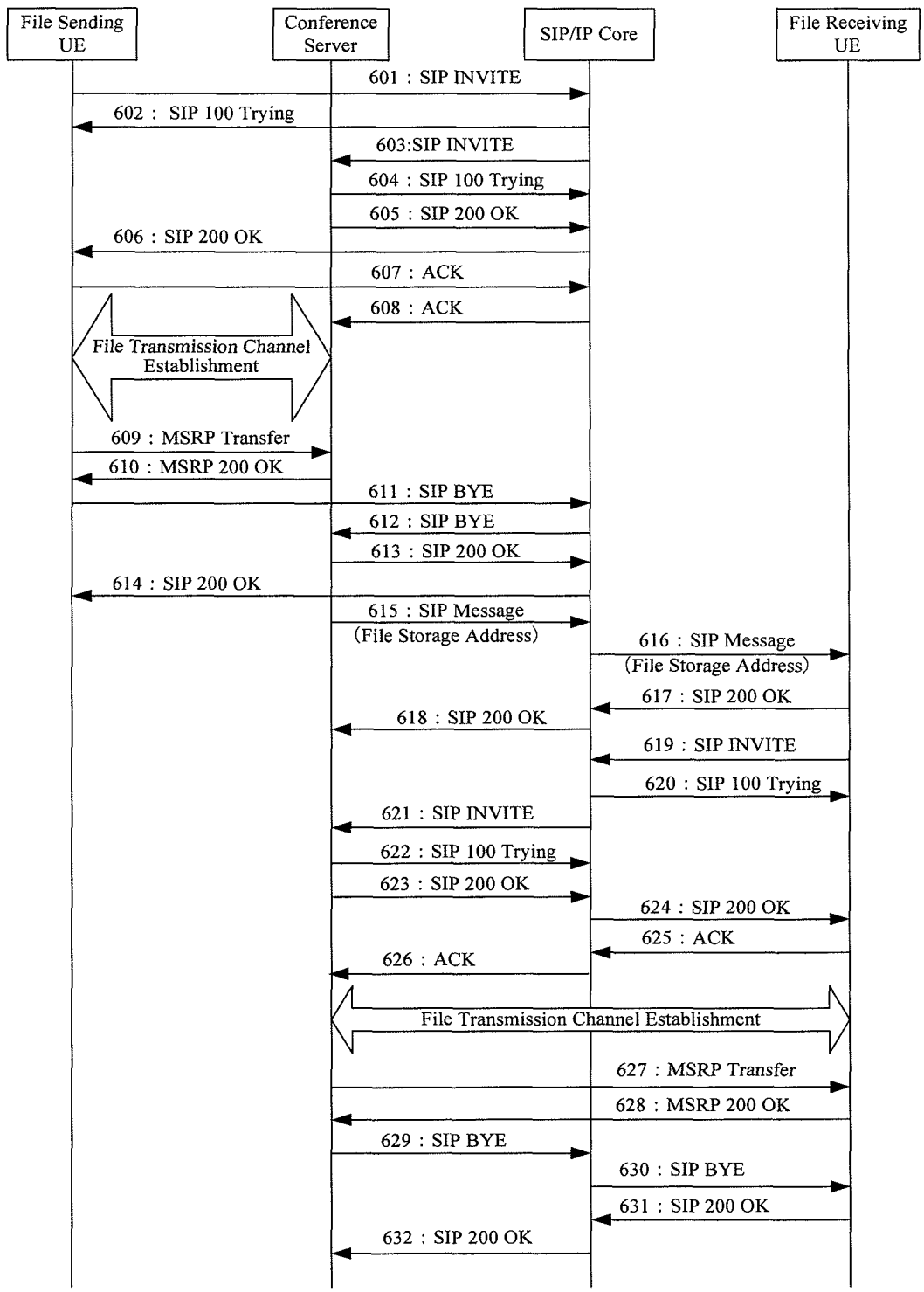
FIG. 6 is a timing diagram of a message flow for transferring a file in a SIP conference, according to a seventh embodiment of the present invention.

FIG. 6 is a timing diagram of a message flow for transferring a file in a SIP conference, according to a seventh embodiment of the present invention. As shown in FIG. 6, the specific steps are described as follows.

Steps 601 to 614 are the same as Steps 301 to 314.

Steps 615 to 632 are the same as Steps 519 to 536.

It should be noted that, when there is more than one file receiving UE, Steps 615 to 632 should be executed once between the conference server and each file receiving UE.

Figure 7:
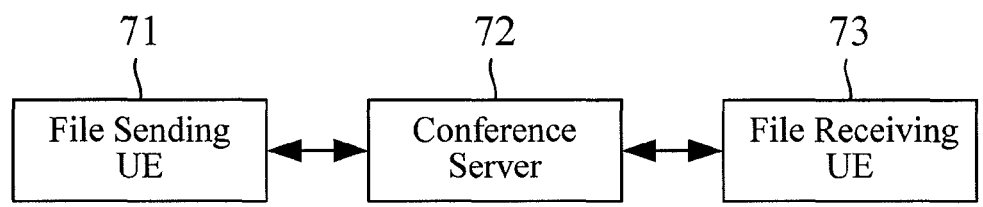
FIG. 7 is a constitutional diagram of a file transfer system in a SIP conference, according to an embodiment of the present invention.

FIG. 7 is a constitutional diagram of a file transfer system in a SIP conference, according to the first embodiment of the present invention. As shown in FIG. 7, the file transfer system mainly includes a file sending UE 71, a conference server 72, and a file receiving UE 73.

When determining to send a file to a file receiving UE in a conference that the file sending UE 71 participates in, the file sending UE 71 is adapted to send a SIP INVITE message carrying a file sending indication information, a conference identification of the conference that the file sending UE 71 participates in, and an identification of a new conference session to the conference server 72 via an SIP/IP core, and send the file to the conference server 72 after receiving a SIP 200 OK message from the conference server 72.

The file sending UE 71 is further adapted to obtain information of participating users in the conference that it participates in from the conference server 72 through a SIP subscription/notification mechanism, and determine a file receiving user, according to the user information.

The conference server 72 is adapted to receive the SIP INVITE message sent by the file sending UE 71, then send the SIP INVITE message carrying the file sending indication information, the conference identification of the conference in which the file sending UE participates, and the identification of the new conference session to the file receiving UE 73 via the SIP/IP core, receive a SIP 200 OK message returned by the file receiving UE 73, return the SIP 200 OK message to the file sending UE 71, and then send the file from the file sending UE 71 to the file receiving UE 73.

The file receiving UE 73 is adapted to receive the SIP INVITE message from the conference server 72, return the SIP 200 OK message to the conference server 72, and then receive and store the file from the conference server 72.

A file transfer system in a SIP conference according to the second embodiment of the present invention is described below, which mainly includes a file sending UE, a conference server, and a file receiving UE.

When determining to send a file to a file receiving UE in a conference that the file sending UE itself participates in, the file sending UE is adapted to send a SIP re-INVITE message or update message carrying a file sending indication information, a conference identification of the conference in which the file sending UE participates, and an identification of an existing conference session to the conference server via the SIP/IP core, and send the file to the conference server after receiving an SIP 200 OK message from the conference server.

The file sending UE is further adapted to obtain information of participating users in the conference that it participates in from the conference server through a SIP subscription/notification mechanism, and determine a file receiving user, according to the user information.

The conference server is adapted to receive the SIP re-INVITE message or update message from the file sending UE, then send the SIP re-INVITE message or update message carrying the file sending indication information, the conference identification of the conference in which the file sending UE participates, and the identification of an existing conference session to the file receiving UE via the SIP/IP core, then receive the SIP 200 OK message returned by the file receiving UE, return the SIP 200 OK message to the file sending UE, and send the file from the file sending UE to the file receiving UE.

The file receiving UE is adapted to receive the SIP re-INVITE message or update message from the conference server, return the SIP 200 OK message to the conference server, and then receive and store the file from the conference server.

A file transfer system in a SIP conference, according to the third embodiment of the present invention is described below, which mainly includes a file sending UE, a conference server, and a file receiving UE.

When determining to send a file to a file receiving UE in a conference that the file sending UE itself participates in, the file sending UE is adapted to send a SIP INVITE message carrying a file sending indication information, a conference identification of the conference in which the file sending UE participates, and an identification of a new conference session to the conference server via the SIP/IP core, and send the file to the conference server after receiving a SIP 200 OK message from the conference server.

The file sending UE is further adapted to obtain information of participating users in the conference that it participates in from the conference server through a SIP subscription/notification mechanism, and determine a file receiving user, according to the user information.

The conference server is adapted to receive the SIP INVITE message from the file sending UE, then return the SIP 200 OK message to the file sending UE 71, receive the file from the file sending UE, then send the SIP INVITE message carrying the file sending indication information, the conference identification of the conference in which the file sending UE participates, and the identification of the new conference session to the file receiving UE through the SIP/IP core, receive the SIP 200 OK message returned by the file receiving UE, and send the file from the file sending UE to the file receiving UE.

The file receiving UE is adapted to receive the SIP INVITE message from the conference server, return the SIP 200 OK message to the conference server, and then receive and store the file from the conference server.

A file transfer system in a SIP conference according to the fourth embodiment of the present invention is described below, which mainly includes a file sending UE, a conference server, and a file receiving UE.

When determining to send a file to a file receiving UE in a conference that the file sending UE itself participates in, the file sending UE is adapted to send a SIP re-INVITE message or update message carrying a file sending indication information, a conference identification of the conference in which the file sending UE participates, and an identification of an existing conference session to the conference server via the SIP/IP core, and send the file to the conference server after receiving an SIP 200 OK message from the conference server.

The file sending UE is further adapted to obtain information of participating users in the conference that it participates in from the conference server through a SIP subscription/notification mechanism, and determine a file receiving user according to the user information.

The conference server is adapted to receive the SIP re-INVITE message or update message from the file sending UE, then return the SIP 200 OK to the file sending UE, receive the file from the file sending UE, then send the SIP re-INVITE or update message carrying the file sending indication information, the conference identification of the conference in which the file sending UE participates, and the identification of the existing conference session to the file receiving UE through the SIP/IP core, then receive the SIP 200 OK message returned by the file receiving UE, and send the file from the file sending UE to the file receiving UE.

The file receiving UE is adapted to receive the SIP re-INVITE message or update message from the conference server, return the SIP 200 OK message to the conference server, and then receive and store the file from the conference server.

A file transfer system in a SIP conference according to the fifth embodiment of the present invention is described below, which mainly includes a file sending UE, a conference server, and a file receiving UE.

The file sending UE is adapted to obtain information of participating users in the conference that it participates in from the conference server of the conference through a SIP subscription/notification mechanism, and determine a file receiving user, according to the user information. When determining to send a file to a file receiving UE in the conference that the file sending UE itself participates in, the file sending UE is adapted to send a SIP INVITE message carrying a file sending indication information and a conference identification of the conference that the file sending UE itself participates in to a conference server of a conference that the file sending UE does not participate in through the SIP/IP core, and send the file to the conference server after receiving a SIP 200 OK message from the conference server.

The conference server is adapted to receive the SIP INVITE message from the file sending UE, then return the SIP 200 OK message to the file sending UE, receive the file from the file sending UE, and then send the SIP INVITE message carrying the file sending indication information and the conference identification of the conference in which the file sending UE participates to the file receiving UE through the SIP/IP core, then receive the SIP 200 OK message returned by the file receiving UE, and then send the file from the file sending UE to the file receiving UE.

The file receiving UE is adapted to receive the SIP INVITE message from the conference server, return the SIP 200 OK message to the conference server, and then receive and store the file from the conference server.

A file transfer system in a SIP conference according to the sixth embodiment of the present invention is described below, which mainly includes a file sending UE, a conference server, and a file receiving UE.

When determining to send a file to a file receiving UE in a conference that the file sending UE itself participates in, the file sending UE is adapted to send a SIP INVITE message carrying a file sending indication information, a conference identification of the conference that the file sending UE itself participates in, and an identification of a new conference session to the conference server via the SIP/IP core, receive a file storage address from the conference server, send a SIP MESSAGE carrying the file storage address to the conference server, and send the file to the conference server after receiving the SIP 200 OK message from the conference server.

The file sending UE is further adapted to obtain information of participating users in the conference that it participates in from the conference server through a SIP subscription/notification mechanism, and determine a file receiving user according to the user information.

The conference server is adapted to receive the SIP INVITE message from the file sending UE, then return the SIP 200 OK carrying the file storage address to the file sending UE 71, then receive the file from the file sending UE, then send the SIP MESSAGE carrying the file storage address from the file sending UE to the file receiving UE, receive the SIP INVITE message from the file receiving UE, and send the file from the file sending UE to the file receiving UE.

Alternatively, the conference server may send the file storage address to the file sending UE after receiving the file from the file sending UE.

The file receiving UE is adapted to receive the SIP MESSAGE from the conference server, determine by itself to receive the file, send the SIP INVITE message carrying the file receiving indication to the conference server, and then receive and store the file from the conference server.

A file transfer system in a SIP conference according to the seventh embodiment of the present invention is described as follows, which mainly includes a file sending UE, a conference server, and a file receiving UE.

When determining to send a file to a file receiving UE in a conference that the file sending UE itself participates in, the file sending UE is adapted to send a SIP re-INVITE message or update message carrying a file sending indication information, a conference identification of the conference that the file sending UE itself participates in, and an identification of an existing conference session to the conference server via the SIP/IP core, and send the file to the conference server after receiving a SIP 200 OK message from the conference server.

The file sending UE is further adapted to obtain information of participating users in the conference that it participates in from the conference server through a SIP subscription/notification mechanism, and determine a file receiving user, according to the user information.

The conference server is adapted to receive the SIP re-INVITE message or update message from the file sending UE, then return the SIP 200 OK message to the file sending UE, then receive the file from the file sending UE, then send a SIP MESSAGE carrying the file storage address to the file receiving UE, then receive a SIP INVITE message from the file receiving UE, and then send the file from the file sending UE to the file receiving UE.

The file receiving UE is adapted to receive the SIP MESSAGE from the conference server, determine by itself to receive the file, and then send the SIP INVITE message carrying a file receiving indication to the conference server, and then receive and store the file from the conference server.

Figure 8:
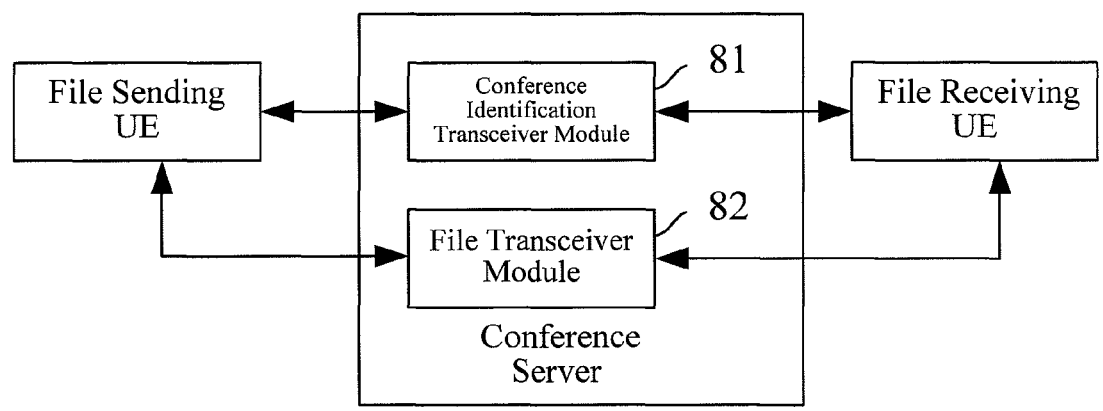
FIG. 8 is a schematic constitutional diagram of a conference server, according to an embodiment of the present invention.

FIG. 8 is a schematic constitutional diagram of a conference server, according to an embodiment of the present invention. As shown in FIG. 8, the conference server mainly includes a conference identification transceiver module 81 and a file transceiver module 82.

The conference identification transceiver module 81 is adapted to receive a conference identification from a file sending UE, send the conference identification to a file receiving UE, return a success indication to the file sending UE, and receive the success indication returned by the file receiving UE.

The file transceiver module 82 is adapted to receive a file from the file sending UE, send the file to the file receiving UE, return a success indication to the file sending UE, and receive the success indication returned by the file receiving UE.

The above descriptions about the process and method in the embodiments are merely intended to demonstrate the present invention but not to limit the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transferring a file in a conference system, comprising:
    sending, by a file sending UE, a SIP re-INVITE message or update message to a conference server when the file sending UE determines to send a file to a file receiving UE in a conference that the file sending UE itself participates in, wherein the SIP re-INVITE message or update message carries a file sending indication information, a conference identification of the conference in which the file sending UE participates and a Call-ID, wherein the file sending UE represents a file sending user terminal, wherein the conference is represented by the conference identification, wherein the value of the Call-ID is the same as the value of the Call-ID of another existing session included in the conference;
    receiving, by a file receiving UE, a SIP re-INVITE or update message carrying the file sending indication information, the conference identification of the conference in which the file sending UE participates and the Call-ID, from the conference server, wherein the file receiving UE represents a file receiving user terminal;
    sending, by the file sending UE, a file to the conference server after the conference server returns a SIP 200 OK to the file sending UE; and
    receiving, by the file receiving UE, the file from the conference server after the conference server receives a SIP 200 OK message returned by the file receiving UE.

2. The method according to claim 1, further comprising:
    obtaining, by the file sending UE, information of participating users from the conference server of the conference in which the file sending UE participates, and determining the file receiving UE, according to the information of participating users.

3. The method according to claim 1, further comprising:
    sending, by the file receiving UE, a request to obtaining the file.

4. The method according to claim 3, further comprising:
    sending, by the file sending UE, a file storage address from the conference server to the file receiving UE through the conference server; and
    sending, by the file receiving UE, the request to obtain the file to the conference server, upon receiving the file storage address.

5. A method for transferring a file in a conference system, comprising:
    receiving, a SIP re-INVITE message or update message from a file sending UE when the file sending UE determines to send a file to a file receiving UE in a conference that the file sending UE itself participates in, wherein the SIP re-INVITE message or update message carries a file sending indication information, a conference identification of the conference in which the file sending UE participates and a Call-ID, wherein the conference is represented by the conference identification, wherein the value of the Call-ID is the same as the value of the Call-ID of another existing session included in the conference;

sending, by the conference server, SIP re- INVITE or update message carrying the file sending indication information, the conference identification of the conference in which the file sending UE participates and the Call-ID;

receiving, by the conference server, a file from the file sending UE after returning the SIP 200 OK to the file sending UE; and sending, by the conference server, the file from the file sending UE to the file receiving UE after receiving the SIP 200 OK message returned by the file receiving UE.

6. The method according to claim 5, wherein the conference server is a conference server of the conference in which the file sending UE participates.

7. The method according to claim 6, further comprising:
establishing file transmission channels between the conference server and the file receiving UE and between the conference server and the file sending UE, according to a conference session in the conference corresponding to the conference identification; and
receiving and sending the conference identification and the file through the file transmission channels.

8. The method according to claim 5, further comprising: receiving a request for obtaining the file from the file receiving UE.

9. The method according to claim 8, further comprising: determining a file storage address, and sending the file storage address to the file sending UE.

10. The method according to claim 9, further comprising: sending the file storage address from the file sending UE to the file receiving UE.

11. The method according to claim 9, further comprising: sending the file storage address to the file receiving UE in response to receiving the conference identification from the file sending UE.

12. A file sending UE and a receiving UE configured to implement the method comprising:
sending, a SIP re-INVITE message or update message to a conference server when the file sending UE determines to send a file to the file receiving UE in a conference that the file sending UE itself participates in, wherein the SIP re-INVITE message or update message carries a file sending indication information, a conference identification of the conference in which the file sending UE participates and a Call-ID, wherein the conference is represented by the conference identification, wherein the value of the Call-ID is the same as the value of the Call-ID of another existing session included in the conference;

receiving a SIP re-INVITE or update message carrying the file sending indication information, the conference identification of the conference in which the file sending UE participates and the Call-ID from the conference server;
sending a file to the conference server after the conference server returns a SIP 200 OK to the file sending UE; and
receiving the file from the conference server after the conference server receives a SIP 200 OK message returned by the file receiving UE.

13. The file sending and receiving UE according to claim 12, further comprising: obtaining users information of the conference in which the file sending UE participates from the conference server and determine the file receiving UE, according to the user information.

14. The file sending and receiving UE according to claim 12, further comprising: sending a request to obtain the file to the conference server.

15. The file sending and receiving UE according to claim 12, further comprising: receiving a file storage address from the conference server and send the file storage address to the file receiving UE through the conference server.

16. A conference server, comprising:
a conference identification transceiver module in a processor, configured to receive a SIP re-INVITE message or update message from a file sending UE when the file sending UE determines to send a file to a file receiving UE in a conference that the file sending UE itself participates in, wherein the SIP re-INVITE message or update message carries a file sending indication information, a conference identification of the conference in which the file sending UE participates and a Call-ID, wherein the conference is represented by the conference identification, wherein the value of the Call-ID is the same as the value of the Call-ID of another existing session included in the conference; and send a SIP re-INVITE or update message carrying the file sending indication information, the conference identification of the conference in which the file sending UE participates and the Call-ID; and
a file transceiver module in the processor, configured to receive the file from the file sending UE after returning the SIP 200 OK to the file sending UE, and send the file from the file sending UE to the file receiving UE after receiving the SIP 200 OK message returned by the file receiving UE.

17. The conference server according to claim 16, further comprising:
a module configured to determine a file storage address and send the file storage address to the file sending UE.

18. The conference server according to claim 16, further comprising: a module configured to determine a file storage address and send the file storage address to the file receiving UE in response to receiving the conference identification from the file sending UE.

* * * * *